Figure 1:
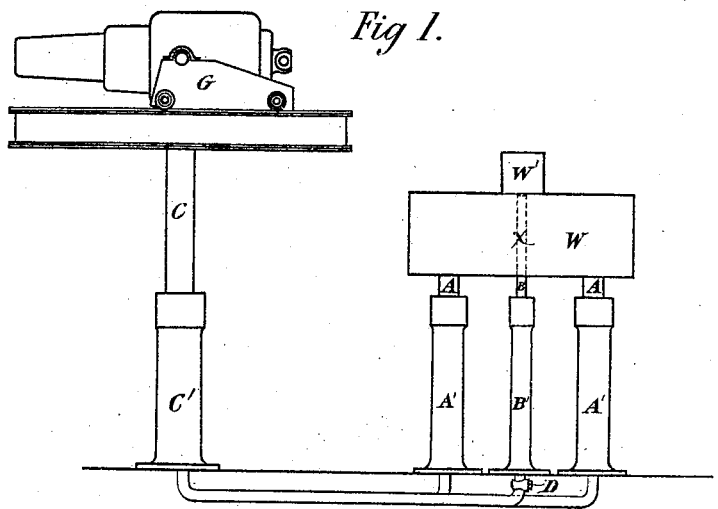

J. L. CLARK & J. STANDFIELD.
HYDRAULIC APPARATUS FOR RAISING AND LOWERING BRIDGES, &c.

No. 181,409.

10 Sheets—Sheet 1.

Patented Aug. 22, 1876.

Witnesses

Inventors

10 Sheets—Sheet 3.

J. L. CLARK & J. STANDFIELD.
HYDRAULIC APPARATUS FOR RAISING AND LOWERING BRIDGES, &c.

No. 181,409. Patented Aug. 22, 1876.

Witnesses
Inventors

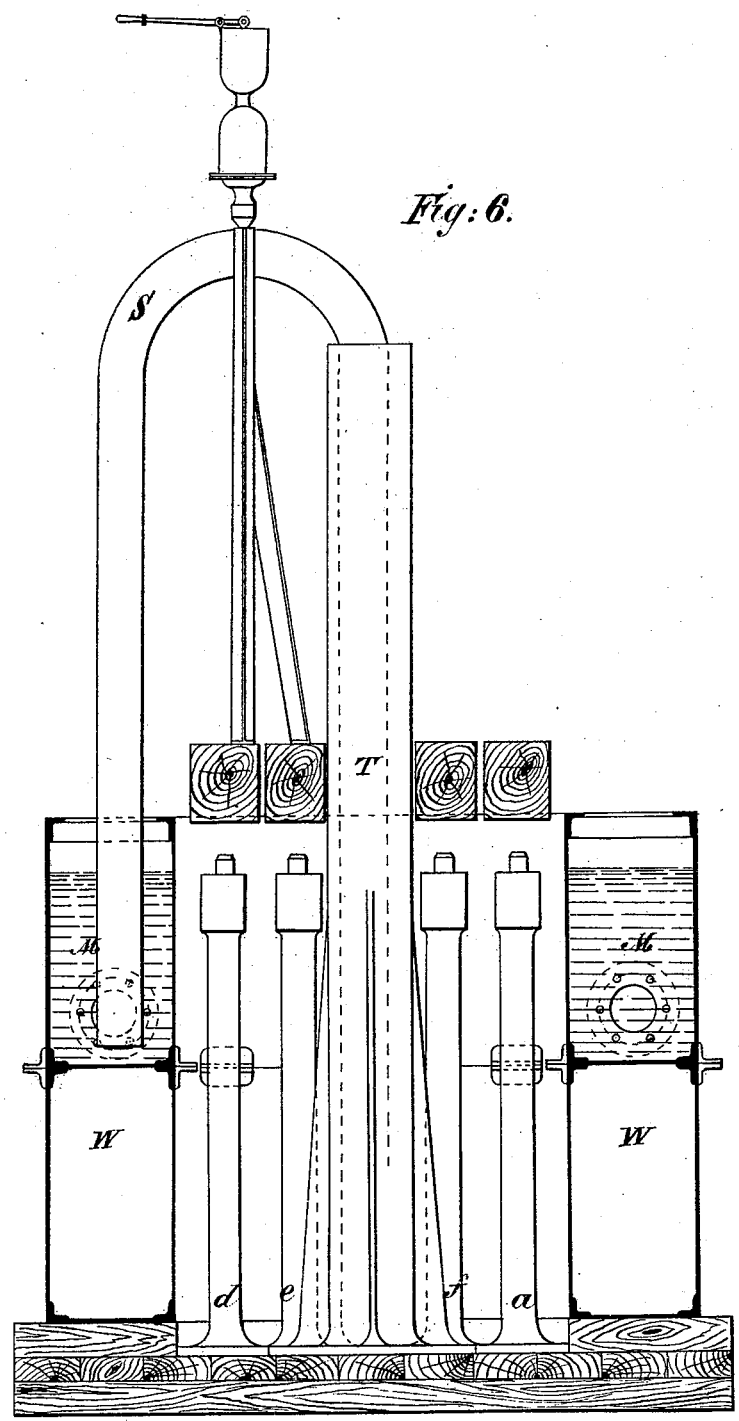

10 Sheets—Sheet 5.
J. L. CLARK & J. STANDFIELD.
HYDRAULIC APPARATUS FOR RAISING AND LOWERING BRIDGES, &c.
No. 181,409. Patented Aug. 22, 1876.
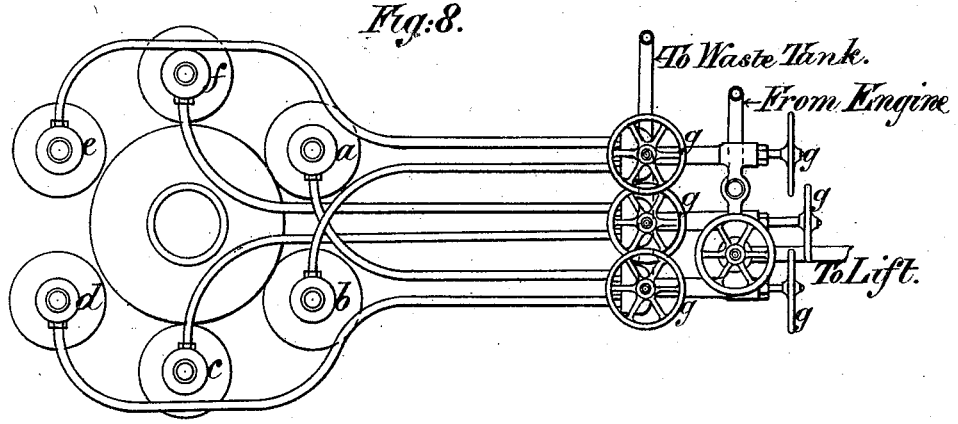
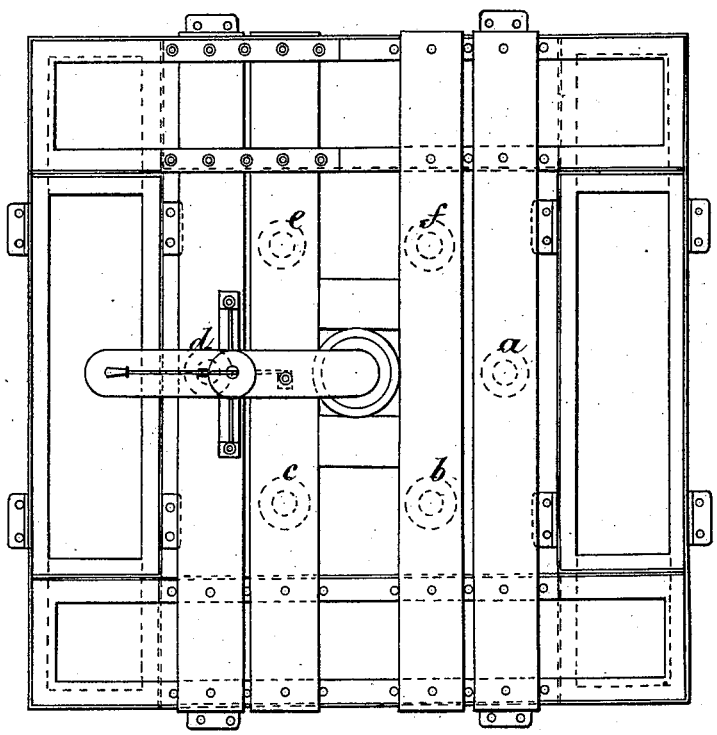

10 Sheets—Sheet 6.

J. L. CLARK & J. STANDFIELD.
HYDRAULIC APPARATUS FOR RAISING AND LOWERING BRIDGES, &c.

No. 181,409.  Patented Aug. 22, 1876.

Witnesses  Inventors

10 Sheets—Sheet 7.
J. L. CLARK & J. STANDFIELD.
HYDRAULIC APPARATUS FOR RAISING AND LOWERING BRIDGES, &c.
No. 181,409. Patented Aug. 22, 1876.
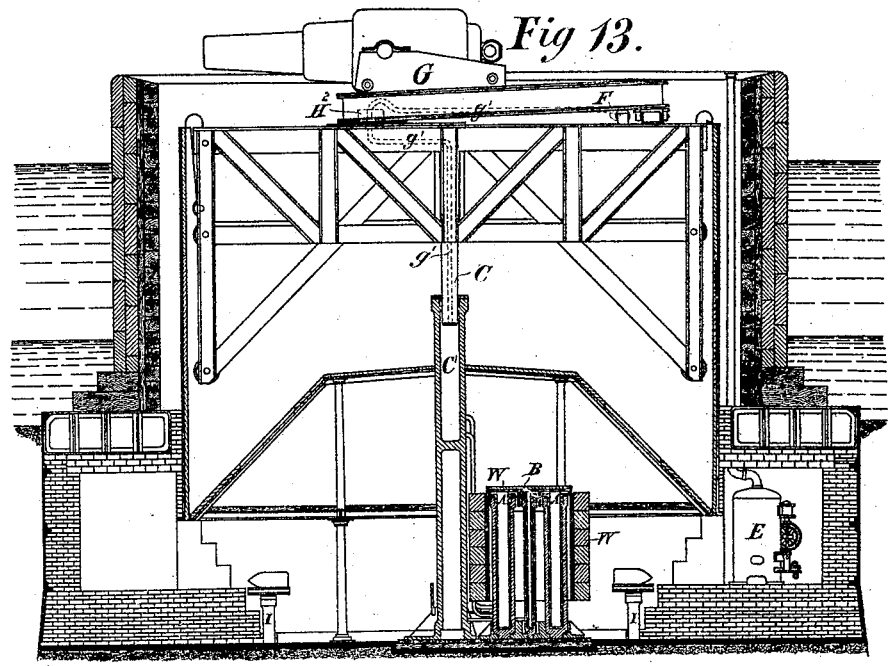
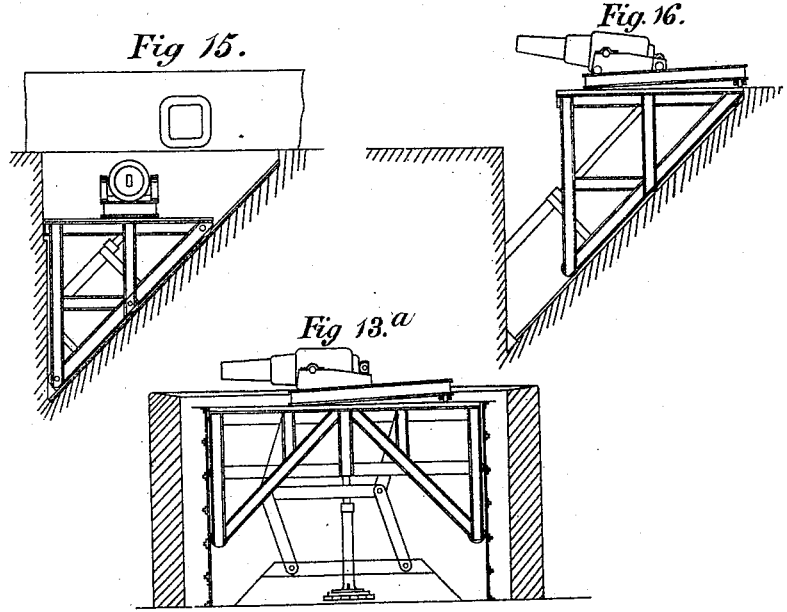
N. PETERS, PHOTO-LITHOGRAPHER, WASHINGTON, D. C.

10 Sheets—Sheet 8.
J. L. CLARK & J. STANDFIELD.
HYDRAULIC APPARATUS FOR RAISING AND LOWERING BRIDGES, &c.
No. 181,409. Patented Aug. 22, 1876.
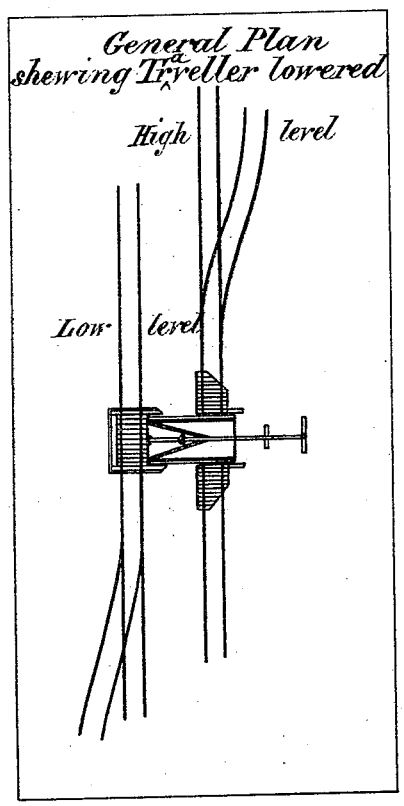
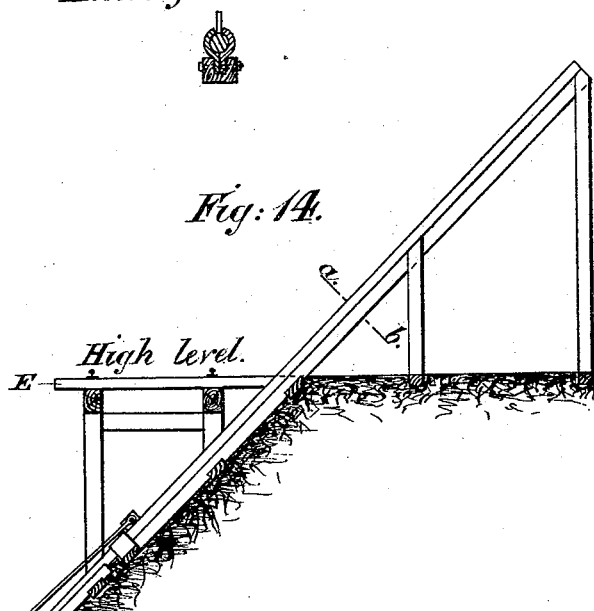
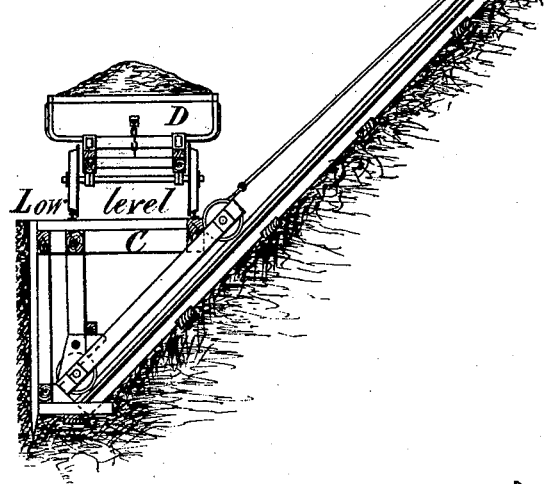
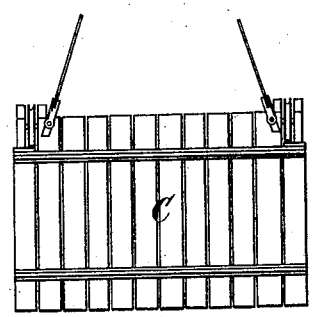

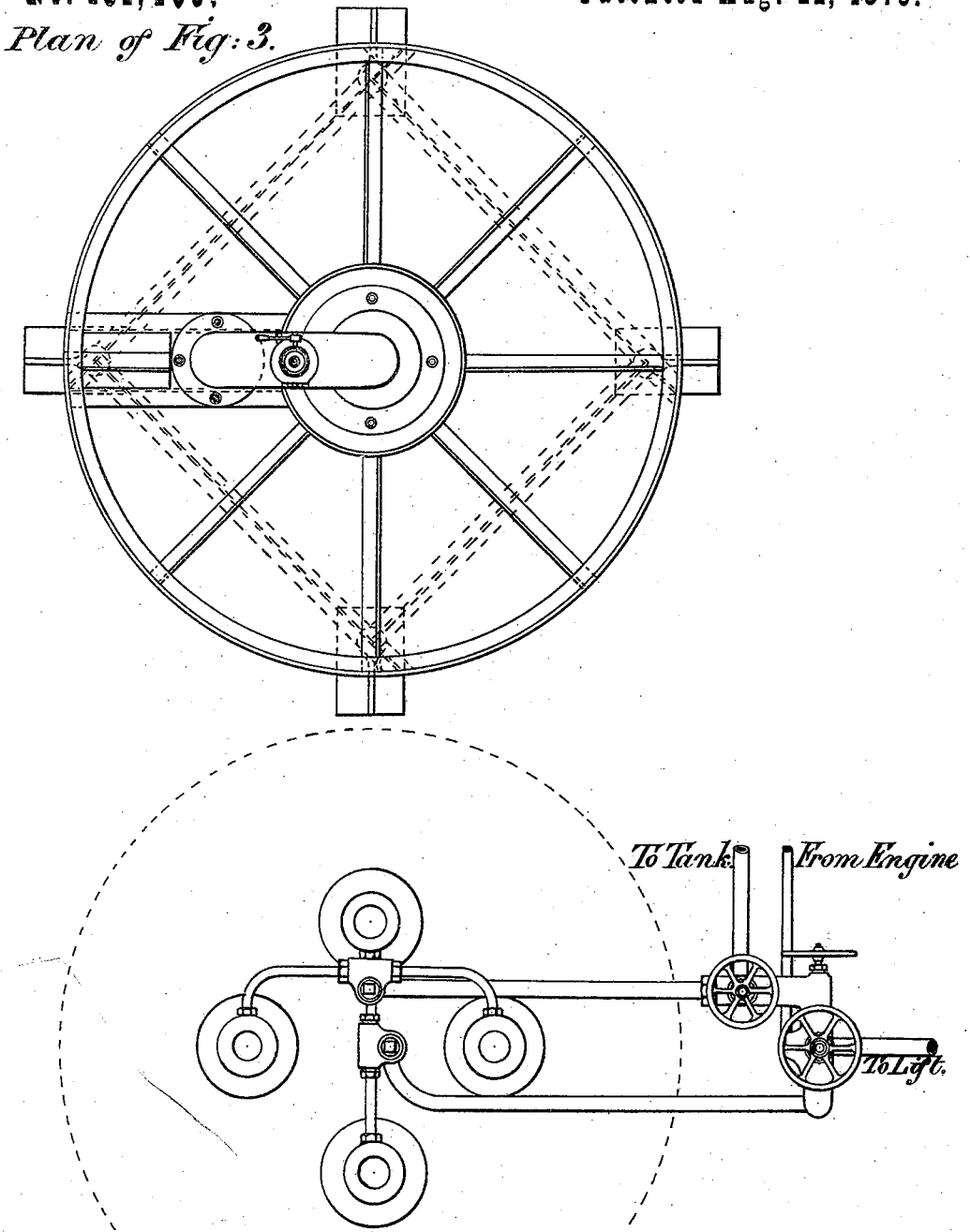

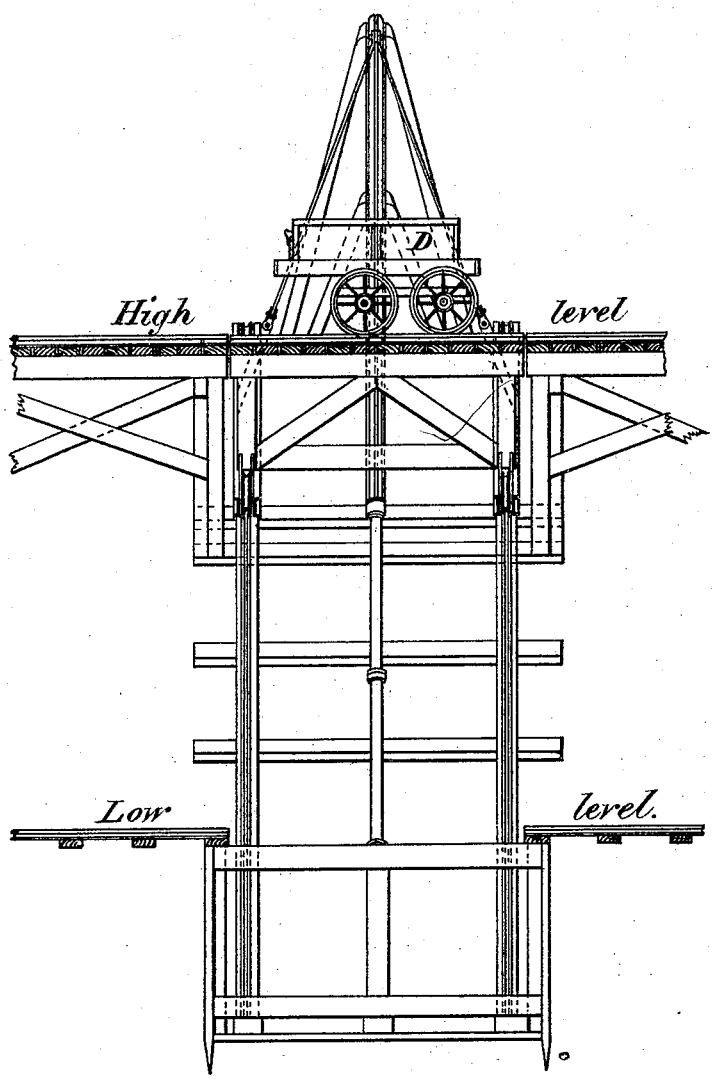

UNITED STATES PATENT OFFICE.

JOSIAH L. CLARK AND JOHN STANDFIELD, OF WESTMINSTER, ENGLAND.

IMPROVEMENT IN HYDRAULIC APPARATUS FOR RAISING AND LOWERING BRIDGES, &c.

Specification forming part of Letters Patent No. 181,409, dated August 22, 1876; application filed September 11, 1874.

*To all whom it may concern:*

Be it known that we, JOSIAH LATIMER CLARK and JOHN STANDFIELD, both of 5 Westminster Chambers, Victoria street, Westminster, England, subjects of the Queen of Great Britain, have invented or discovered new and useful Improvements in Hydraulic Apparatus Applicable for Raising and Lowering Bridges, canal-lifts, guns, and other heavy weights; and we, the said JOSIAH LATIMER CLARK and JOHN STANDFIELD, do hereby declare the nature of the said invention, and in what manner the same is to be performed, to be particularly described and ascertained in and by the following statement thereof—that is to say:

Our invention consists, first, of an improved differential accumulator for working hydraulic lifting-presses, by means of which the dead weight of the machinery which has to be raised and lowered is constantly balanced, so that only a small additional power is required to give it motion.

In the following description we call the rams of the presses of the accumulator "plungers," and those of the hydraulic press "rams." To effect this we construct an accumulator with two, three, or more plungers. We usually prefer to employ three plungers, two of which are of such dimensions as to produce exactly sufficient pressure on the ram of the hydraulic press to balance the dead weight of the machinery carried by it. In this condition the accumulator and the hydraulic press are in equilibrium, and a very small increase or decrease of pressure suffices to cause the hydraulic ram to ascend or descend, as the case may be. An extra load is then put on the accumulator, sufficient to cause it to descend and to raise the hydraulic ram with any desired load upon it. The third plunger is placed centrally under the head of the accumulator, and is so connected by pipes with the two outer plungers that all three can be placed into connection at will. If the accumulator is down, and the ram elevated, as just described, and the communication is opened between the three plungers, the weight of the accumulator, which was at first supported by two plungers, being now supported by three, the pressure on the water is diminished, and consequently the accumulator ascends and the ram descends.

In order to raise it again it is only necessary to allow the water to escape from the central plunger, when the whole weight becomes supported on the two plungers, as before, and the pressure is consequently increased, and the ram again ascends. A small pump is employed to keep the accumulator charged in the usual manner.

In order still further to diminish the loss of power entailed when raising and lowering heavy weights by hydraulic rams, we also compensate for the varying immersion of the rams.

When a ram is raised in the ordinary manner, it is evident that as the ram ascends out of the water into the air it increases in weight, and its force or power diminishes by an amount which is equal to the weight of a column of water of its own bulk, and, similarly, as the plunger of an accumulator descends it also loses a power equal to the bulk of the column of water which it displaces, and both of these actions concur to diminish the power of the machine more and more as it approaches the full extent of its stroke. To obviate this evil, we increase the load on the accumulator as its plunger descends by a weight of water sufficient to compensate for the varying immersion of the plunger, and of the ram of the press. By this means the whole of the dead weight of the machine itself is perfectly counterpoised in every position, and the only power required to work the machine is that requisite to raise the load itself and to overcome friction. We also, by the same means, are enabled to give increased power at the end of the stroke by adding to the load a greater weight of water than is required for compensating for the varying immersion of the rams and plungers; or conversely-decreased power may be given at the end of the stroke by causing weighted tanks or vessels, which form the load of the accumulator, to descend into water.

Where it is desirable that two or more rams should ascend synchronously through equal distances, as in the instance of the two ends of a bridge or canal lift, or in raising guns, &c., we combine two or more plungers into a group beneath one accumulator, so that as the plungers descend all the rams ascend through uniform distances.

In order to cause all four corners of a bridge or other moving apparatus which is supported by presses at its two ends, to ascend or descend in a horizontal position, we provide means for allowing an escape of water from beneath either of the rams, if from any cause one of them should become elevated above the other.

To prevent the danger and inconvenience which arises from the leather of a ram or plunger giving way during use, we in some cases employ two or more leathers, arranged one above the other with a warning-pipe fitted between them. The strain is ordinarily borne by the lower leather; but if this wears away or bursts, the strain comes upon the upper one, and at the same time the water rushing out of the warning-pipe gives notice of the failure of the leather. A tap or valve fixed on this pipe is then closed, so as to prevent further escape until a convenient opportunity arises for removing the damaged leather.

For conveniently renewing the leathers of a press, we employ a gland of peculiar construction. The press is furnished inside with a number of vertical slots descending for a few inches, and the gland is provided with a similar number of projections, which fit into these slots. At the bottom of all these slots an annular ring is turned out of the press, so that when the gland is fully inserted it can be turned round through a small portion of a circle, so that each projection locks bayonet-fashion under the metal projections of the press.

In order that our said invention may be fully understood and readily carried into effect, we have shown in the drawings hereunto annexed various examples of hydraulic apparatus arranged according to our invention.

Figure 1 shows an accumulator, such as hereinbefore first described, used for raising and lowering a gun. The accumulator is constructed with three presses, $A^1$ $B^1$ $A^1$, and three plungers, A B A. They are loaded with the weight W, which is so adjusted as to balance the gun G supported on the press C' and its ram C.

The plungers A A are of such dimensions that, when loaded with the weight W and connected jointly with the ram C, they just balance the weight of the gun G, which is, therefore, free to be raised or lowered without any power, except that necessary to overcome friction.

When this equilibrium has been obtained a small additional weight, W', is added on to the accumulator, which consequently descends and elevates the gun G to its full height. All this time the supplemental plunger B is out of action, and is merely connected by a pipe with the supply-reservoir.

If it be desired to cause the gun to descend, the tap D, in connection with the small or supplemental plunger B, is opened so as to place all three plungers in communication. The pressure being now distributed over all three plungers instead of only two, causes the weight W to ascend and the gun G to descend.

If it be again required to raise the gun G, it is only necessary to close the tap D, and the weight of the accumulator, coming only on the two plungers A A, again causes the gun to ascend as before, the water under the small plunger B being, as before, allowed to return back into the supply-reservoir.

In this way the gun G may be raised and lowered at pleasure by the mere turning of the tap D, and the only power wasted is that of the small plunger B, which is made of such size as to be just sufficient to overcome the necessary friction.

It is evident that the same effect of obtaining a slight variation of pressure in the accumulator may be produced by either allowing the weight W' to rest on the weight W or holding it off therefrom, and this may be done in many ways. For example, it may be effected by the central plunger, in the manner indicated by the dotted lines $x$. Thus, if water under pressure is introduced below the central plunger, and the weight W' raised, the gun will descend; but if the weight W' is allowed to rest upon the weight W, the accumulator will descend and the gun again rise.

It is also evident that the central plunger B may be operated from any independent source of pressure without having any communication with A and A.

In this case the weight W is made heavier than the weight or gun to be moved, and in order to cause the gun to descend pressure is applied to the center plunger B, and thus the weight W may be made to rise and fall at will. These principles apply to all the cases hereafter described.

If instead of raising and lowering a fixed weight, G, it be desired to raise a load which is removed at the top, such as a wagon of earth, &c., it is only necessary to increase the weight W' to sufficient extent, and to increase the size of the plunger B. The ram will then ascend with its load, and when it is deposited at the top it can be caused to descend by opening the tap D in the same manner as before.

In order still further to diminish the loss of power entailed in raising and lowering heavy weights by hydraulic rams, we also compensate, as above stated, for the varying immersion of the rams and plungers at all parts of their stroke by increasing the load on the accumulator as its plungers descend.

Figure 2:
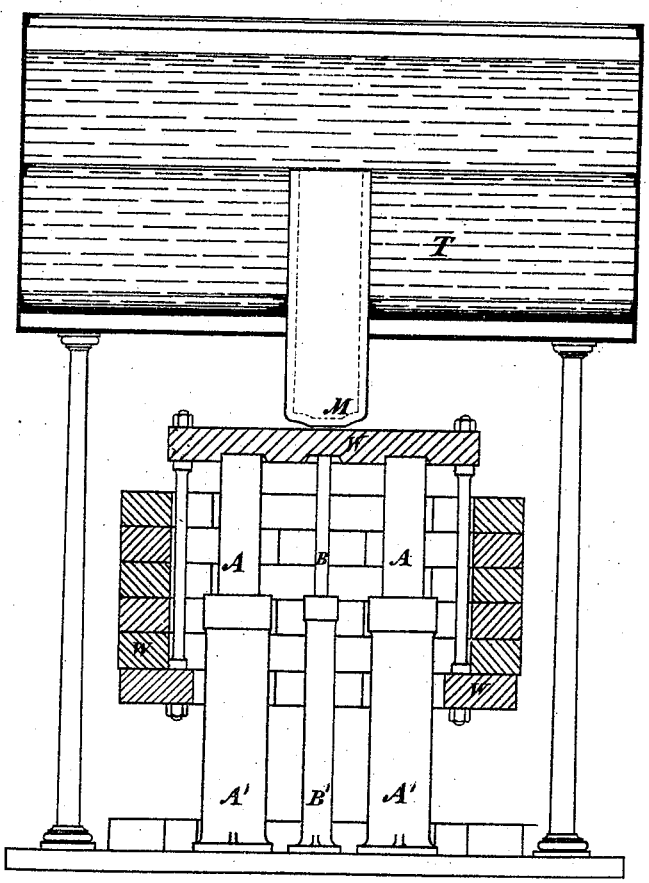

At Fig. 2 we have shown an accumulator constructed in a suitable manner for effecting this object. $A^1$ $B^1$ $A^1$ and A B A are the presses and plungers of an accumulator such as that before described. A tank of water, T, is fixed above the accumulator, and a compensating-plunger, M, works through a leather collar in the bottom of the tank, and rests upon the top of the accumulator. The upper portion of the plunger M is always under water, and its sectional area is equal to twice the sectional area of the plungers A B A, and it may be either solid or hollow.

When the plungers are at the bottom of their stroke the compensating-plunger M is at the bottom of the tank, and supports the whole weight of the column of water above it; but when the plungers are at the top of their stroke the top of the compensating-plunger is near the surface of the water, and consequently supports no pressure except that of its own weight.

If the proportions above named be carried out, it follows that at every part of the stroke, whatever be the number or dimensions of the plungers or rams, they will always be compensated at every portion of the stroke. We also compensate for the rise and fall of the water in the tank T, caused by the rise and fall of the plunger in it by making the plunger M a little larger than the proportions before stated in the ratio which its sectional area bears to that of the tank, so that if the area of the tank be ten times that of the compensating-plunger M, we make the latter one-tenth larger than the proportions above given. For example: let $a$ be the area of all the plungers, $t$ the area of the tank, and $m$ the area of the compensating-plunger, its size, when adjusted for perfect equilibrium, should be $m = 2a + (2a \times \frac{m}{t})$. In this case the equilibrium of the apparatus will be absolutely perfect at every portion of the stroke.

Figure 3:
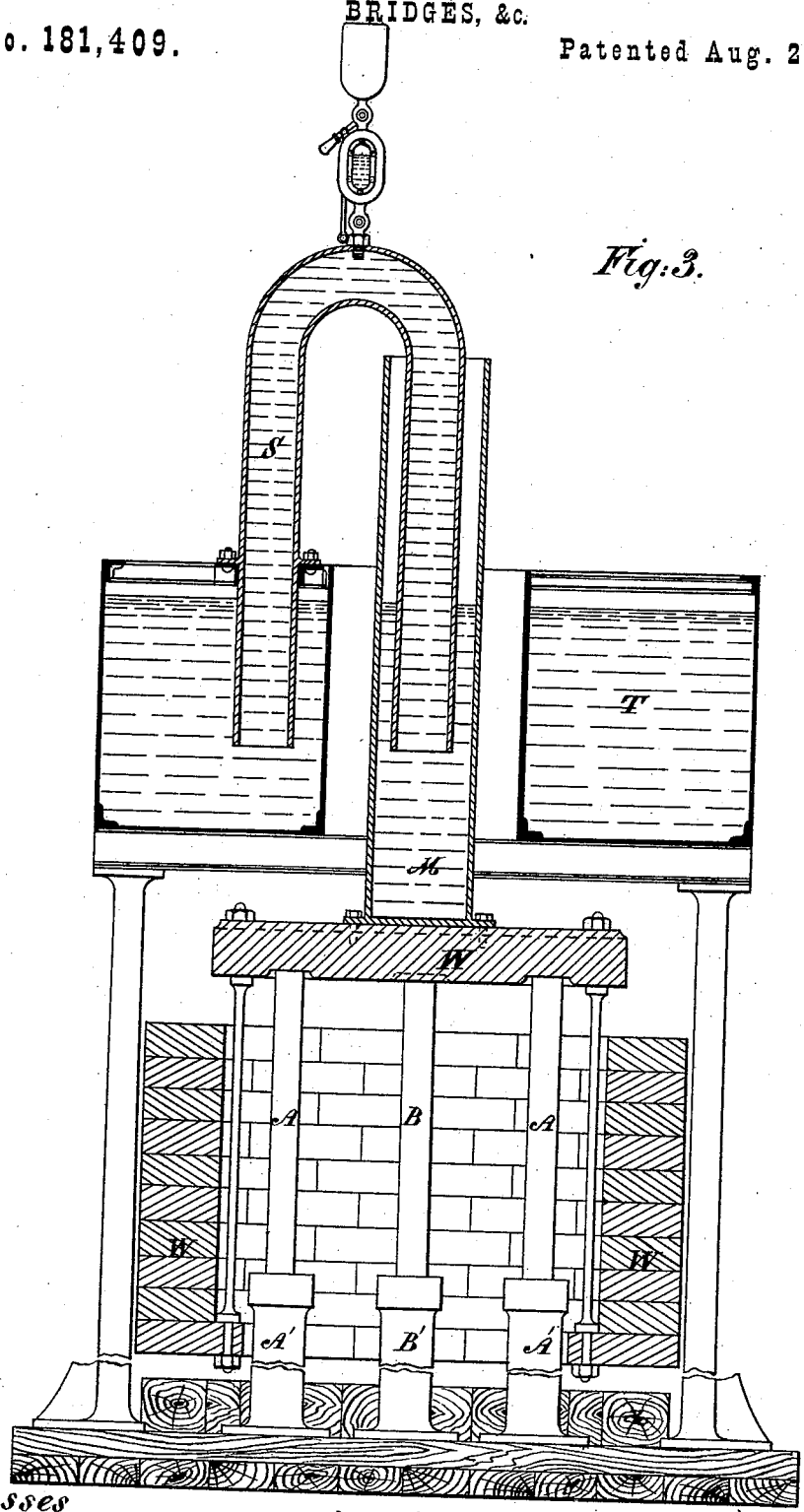

Figs. 3 show a modification of this arrangement, in which the compensation is effected by a fixed siphon, S, supported by the tank T. The accumulator, in addition to its weighted load W, carries a compensating water-tank, M, which rises and descends with it. The siphon S dips into this tank, and as it descends the tank becomes filled with water, and its weight increased, and when it ascends the water flows back again through the siphon S, and the load is diminished, so as to preserve the equilibrium at all points of the stroke.

If $a$ be the area of the plungers, $t$ the area of the tank, and $m$ the area of the compensating-tank, the proper size for this tank, when adjusted for perfect equilibrium, will be $m = 2a + (2a \times \frac{m}{t})$. The compensator M, whether consisting of the simple plunger or of the tank automatically loaded and lightened, effects the desired result.

Figure 4:
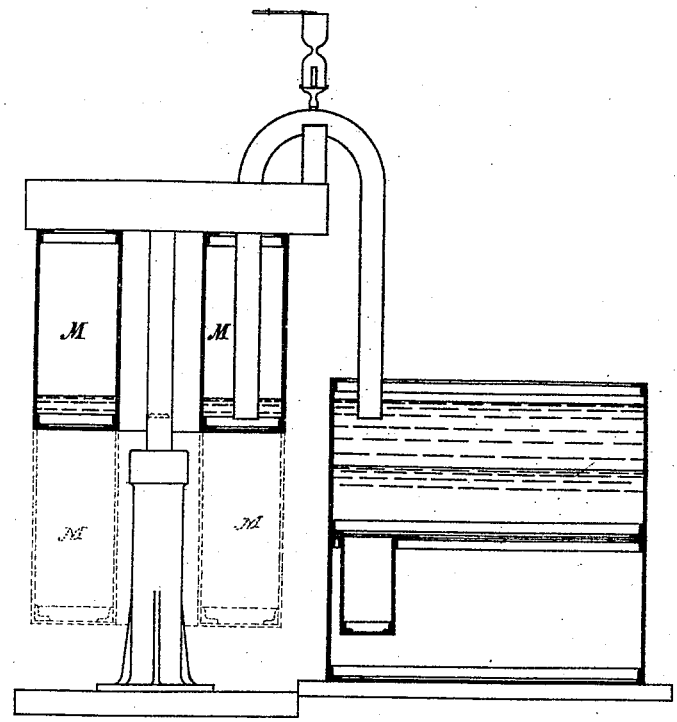

At Fig. 4 is shown a modification of this arrangement, in which the accumulator is constructed to commence with a small pressure and finish with a heavy pressure, as is required when pressing cotton and such like. M is the compensating-tank, shown at the top of its stroke, and nearly empty. In this position of the compensator the pressure on the accumulator is small. It is also shown, in dotted lines, at the bottom of its stroke. It is then full of water, and the pressure on the accumulator is at a maximum.

It is obvious that by making the tank of the compensator conical, or of any other variable shape, varying degrees of pressure can be obtained at different parts of the stroke at pleasure.

Figure 5:
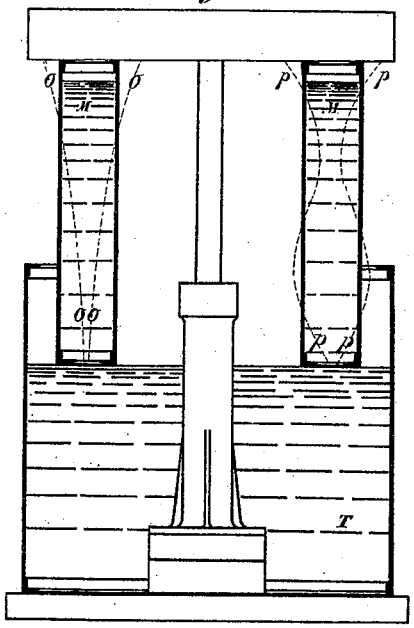

The converse of the above arrangement is shown at Fig. 5. In this figure the compensating-tank M M is again shown at the top of its stroke, and in this position it gives its highest pressure.

As the plunger descends, the compensating-tanks M M become submerged in the water-tank T, and the pressure is reduced uniformly. These tanks of the compensator, also, may be of any desired form to vary the pressure in any manner and extent desired at different parts of the stroke. Two forms of tank are shown by the dotted lines $o\,o$ and $p\,p$. Compensation of this kind is required, for example, in raising a lift-bridge or draw-bridge, which requires its greatest power at the commencement of the lift, and a diminishing power as the bridge is gradually raised.

Fig. 6 shows a modification of the arrangement shown at Fig. 3. In this case the siphon rises and falls with the compensating tank M, and the tank T is formed by a hollow central column. This arrangement can also be adapted to vary the load on the hydraulic press, at different parts of its stroke, in any manner that may be desired. The accumulator shown in this figure is also formed with several plungers combined into a group, so that when it is desirable to cause several rams to ascend synchronously through equal distances, as in the case of lifting the two ends of a bridge or a canal-lift or gun-platform, the several rams employed may be supplied with water under pressure from separate plungers, and all the rams be thereby caused to ascend through uniform distances.

Plan views of the accumulator are shown at Figs. 7 and 8, the view shown at Fig. 6 being a vertical section. In all three figures, $a$, $b$, $c$, $d$, $e$, and $f$ are the six rams and plungers of the accumulator.

Figure 9:

To illustrate the working of such an accumulator, we have shown at Fig. 9 a bridge adapted to be supported by four hydraulic presses, one to be arranged in each of the towers. Four of the plungers, $a\,b\,c\,d$, are connected, respectively, by pipes with four hydraulic presses at the corners of the bridges, and the accumulators are so loaded as to descend and to raise the bridge when the weight rests on these four plungers only. $e$ and $f$ are used for lowering the bridge, and whenever they are placed in connection with the other four plungers the accumulator rises and the bridge descends, as previously described in Fig. 4. On the other hand, when the communication with the two presses $e$ and $f$ is cut off, the whole weight of the accumulator comes on $a\,b\,c\,d$, the four plungers descend, and the bridge is raised. Since these four plungers are all independent, and are connected independently to the four presses at the corners of the bridge, all four corners must rise at exactly the same speed and to the same level.

When a vessel desires to pass, the bridge is either submerged under water to a sufficient depth to allow the vessel to pass over it, as shown at Fig. 9, or lifted in the air sufficiently high for the vessel to pass beneath it. In a similar manner a gun-platform may be raised and lowered by two or more rams supplied with water under pressure from separate cylinders of an accumulator, such as above described, and thereby insure the raising and lowering of the platform in a horizontal position.

Figure 10:
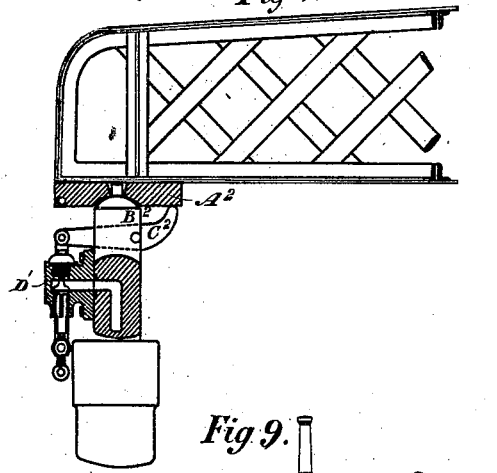

In order, further, to cause both ends of a bridge, or other moving apparatus, to maintain a horizontal position while ascending or descending, we fix shafting and pinions on the bridge, which engage in fixed racks at the ends of the bridge in connection with valves, which are opened when one end becomes higher than the other, so as to compel both ends to rise or fall at the same speed; or we employ an arrangement similar to that shown in Fig. 10. The end of the bridge rests on a bed-plate, $A^2$, which is supported on the top of the ram $B^2$, and is free to rock upon it if either end of the bridge becomes lifted or depressed more than the other. If we suppose the end of the bridge at $A^2$ becomes raised faster than the opposite end, the bed-plate $A^2$ will press upon the multiplying-lever $c^2$, and cause it to open the valve $D'$, and allow some of the water to escape out of the press, and the end of the bridge to descend until the bed-plate again becomes level, when the valve will close itself.

A similar apparatus is fixed at the opposite end of the bridge, so that if either end tends to become elevated more than the other the water is allowed to escape until the ends again become level. A similar arrangement is employed to keep the bridge level transversely.

For conveniently renewing the leathers of a press we employ, as before stated, a gland of peculiar construction. The mouth of the press is furnished inside with a number of vertical slots descending for a few inches, and the gland is provided with a similar number of projections, which fit into these slots. On the bottom of all of these slots an annular ring is turned out of the press, so that when the gland is fully inserted it can be turned round through a small portion of a circle, so that each projection locks bayonet-fashion under the corresponding projections of the press.

Figure 11:
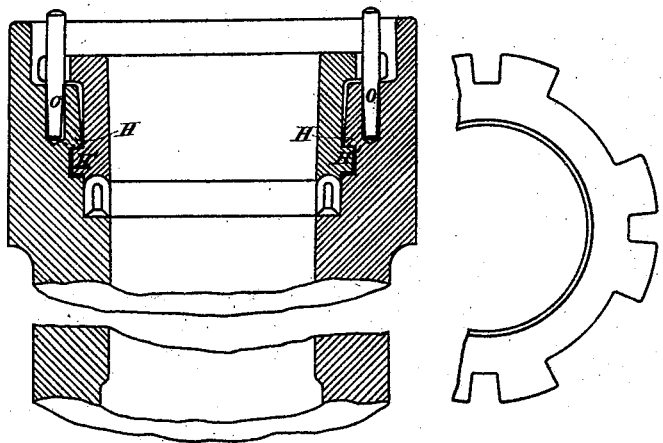
Figure 12:
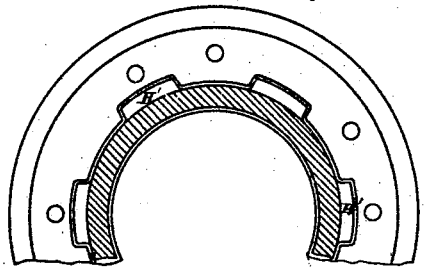

In Fig. 11, H H show a section of the projections on the press, and $H^1$ $H^1$ the projections on the gland. The gland is kept in position by pins O O, which are thrust in it when it has been turned round in its place. When these pins are removed the gland can be turned round through a portion of a circle, and readily removed to get at the leather fitting in the annular groove or seat in the bottom of the gland. Fig. 12 shows the same arrangement in plan.

At Fig. 13 we have shown more in detail an accumulator constructed according to our invention applied to the rapid raising and lowering of heavy guns. $C'$ is the press, and C the ram supporting the gun G on a circular platform, which is free to revolve. The accumulator is shown at A B A W, and it is kept constantly supplied with water under pressure by a small engine, E, placed in any convenient position. The power for traversing the gun is obtained by a small hydraulic press, F, which is connected with the ram by the pipe $g'$ $g'$. By thus employing a single central ram to raise and lower the gun, in combination with a differential accumulator, such as hereinbefore described and shown in the drawings, not only is the platform carrying the gun free to rotate on the point $H^2$ with its stuffing-boxes, but the gun can also be raised and lowered with but little expenditure of power. The shot may be lifted to the mouth of the gun by a small press, I I.

To insure that the gun-platform shall maintain a horizontal position as it is being raised and lowered, parallel levers may be employed in the manner shown at Fig. $13^a$. A contractor's lift, such as shown at Fig. 14, may also be worked with an accumulator, such as hereinbefore described.

The accumulator may be such as shown at Figs. 6, 7, and 8. The press is shown at A B, Fig. 14, at an angle of forty-five degrees. Whenever C carries a wagon, D, or other load, it may be raised up to a higher level at E, where the wagon is removed, and replaced by an empty wagon, which descends to a lower level, the power used in raising the platform and empty wagon being again given back to the accumulator as it descends. The accumulator is so arranged as to have different powers. Thus, when all six presses are connected with the empty platform it descends. If two of these presses be cut off, and the weight of the accumulator be allowed to rest on the remaining four, the pressure is sufficient to raise the platform with the ordinary load. If three of the presses, $d f b$, Figs. 6, 7, and 8, are shut off, and the weight allowed to remain on the remaining three, it will raise a wagon with a heavier load; and if four of the presses are shut off, $a$ $b$ $d$ $e$, and the weight of the accumulator allowed to rest on the remaining two presses, it will be in a position to lift the heaviest load, and all these changes may be made on the instant by opening the valves $g$ $g$.

A similar hydraulic lift, placed at an angle, may be employed for raising and lowering guns, as shown at Figs. 15 and 16. In the arrangement shown at Fig. 15 the gun is raised and lowered sidewise, whereas in Fig. 16 it is raised and lowered on an incline in a line with the gun.

Having thus described our invention, we would state that we claim—

1. The combination, substantially as hereinbefore set forth, of the lifting-ram, the weighted accumulator, and the supplementary plunger thereof, whereby the weight or load is permanently balanced and its raising and lowering effected by throwing the supplementary plunger out of or into action.

2. The combination, substantially as hereinbefore set forth, of a weighted accumulator, with a series of cylinders and plungers, a part or all of which can be caused to sustain the load of the accumulator according to the pressure desired.

3. The combination, substantially as hereinbefore set forth, of the weighted accumulator, the ram, and a compensator, substantially such as described, whereby the varying immersion of the accumulator, plungers, and the ram is compensated.

4. The combination, substantially as hereinbefore set forth, of the accumulator, the hollow compensator, the tank, and the siphon connecting the tank and compensator, whereby the pressure is automatically regulated.

5. The combination, substantially as hereinbefore set forth, of the weighted accumulator, a series of cylinders and plungers, and a series of presses, the rams of which move synchronously through stated distances to lift a load uniformly, whereby each press is operated from the accumulator independently of the others by its corresponding cylinder and plunger.

6. The combination, substantially as hereinbefore set forth, of the accumulator, a series of cylinders and plungers, a series of rams, each operated from the accumulator independently of the others by its own cylinders and plungers, and the automatic relief-valves, whereby inequality of pressure is compensated and the movement of the body in a horizontal position is secured.

7. The packing-gland, constructed as described, with vertical slots to form projections, and an annular groove to form a seat for the cup-leather, for the purpose specified.

8. The combination, substantially as hereinbefore set forth, of the packing-gland, constructed with vertical slots and a seat for the cup-leather, the press having vertical slots and an annular ring or groove, and the locking-pins, whereby the cup-leather may be removed or inserted and secured in place at will.

9. The hydraulic lifting apparatus, hereinbefore described, consisting of the combination of the platform for supporting the weight to be lifted, the ram upon which the platform is mounted, an accumulator weighted to counterpoise the article to be lifted, lifting cylinders and plungers, and a supplementary cylinder and plunger which raises and lowers the weight by disturbing the counter-balance of the apparatus as it is thrown into and out of action.

JOSIAH LATIMER CLARK.
JOHN STANDFIELD.

Witnesses:
  WILMER M. HARRIS,
  H. MURCH,
Both of No. 17 Gracechurch street, London.